Sept. 18, 1956 G. L. BEERS 2,763,524

PHONOGRAPH RECORD STORAGE SYSTEM

Filed Jan. 29, 1953

INVENTOR
George L. Beers
BY Morris A. Rabkin
ATTORNEY 2,763,524

PHONOGRAPH RECORD STORAGE SYSTEM

George L. Beers, Haddonfield, N. J., assignor to Radio Corporation of America, a corporation of Delaware Application January 29, 1953, Serial No. 333,899

2 Claims. (Cl. 312—13)

The present invention relates to phonograph record storage arrangements and devices, and more particularly, but not necessarily exclusively, to a novel rigid record container in combination with means in a record storage cabinet whereby one or more of the containers is detachably receivable by means within the cabinet and is movable laterally of the cabinet. The record container of this invention may be used initially as a covered package for marketing records, and the container can function in a record filing system.

A record storage device has been proposed in which an envelope for holding a record is positioned between separating partitions in a cabinet. One envelope is required for each record thus having the disadvantage of requiring a large number of envelopes for the storage of records. Moreover, the separating and supporting partitions required by the prior art storage arrangement decreases the useful storage space. The presence of partitions, which are required not only to separate the envelopes but to maintain them in an upright position, precludes moving of the envelopes laterally to a desired position. A more or less rigid classification system is thus imposed on the record storage arrangement. In accordance with the present invention a novel phonograph record storage system is provided in which rigid self-supporting containers or boxes, designed to contain one or more records, are provided with means for detachable engagement with a box holding means in a cabinet. It is unnecessary to provide separate supports in the nature of cabinet partitions for the individual containers or boxes. This latter feature of storage systems embodying the invention permits the containers or boxes to be moved laterally of the cabinet or other storage enclosure without the need for first removing the boxes.

The principal object of the present invention is to provide a novel phonograph record storage system in which self-supporting containers are detachably received by means associated with a record storage shelf or the like.

A further object of the invention is to provide a novel record container which is self-supporting and which is provided with means for detachable engagement on pivot means associated with a record storage shelf, cabinet, or the like.

Another object of the invention is to provide a novel record storage container of special construction which may be molded from a plastic material or frabricated of metal such, for example, as aluminum.

Other objects and advantages of the present invention will, of course, become apparent and immediately suggest themselves to those skilled in the art to which the invention is directed from a reading of the following specification in connection with the accompanying drawing in which.

Figures 1, 2, 3, 4, 5:
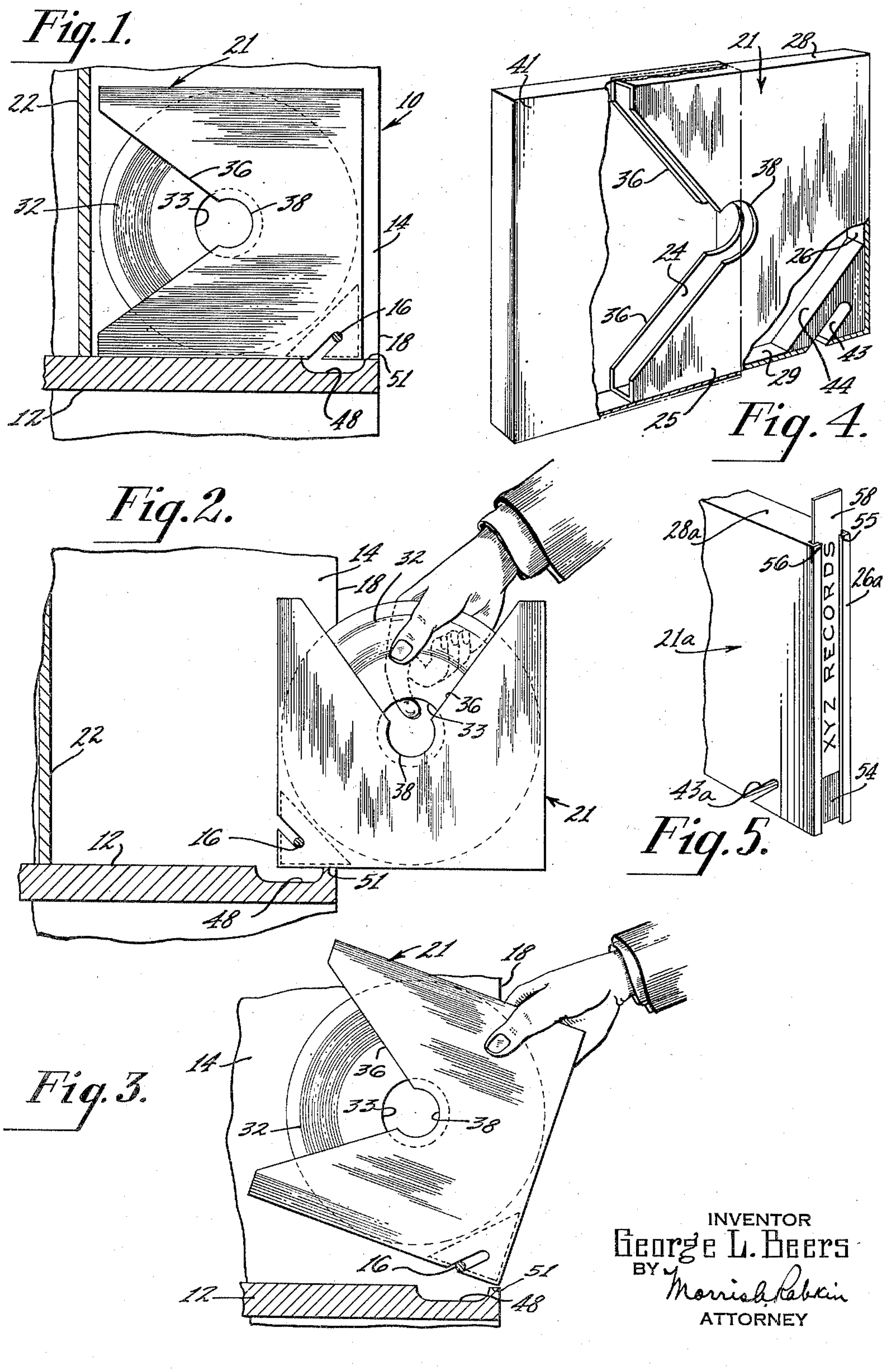
Fig. 1 is a view in side elevation of a record container of this invention positioned on a record storage shelf of a cabinet or other record receiving enclosure.
Fig. 2 is a view similar to Fig. 1 showing the container of Fig. 1 in position for the removal or replacement of records.
Fig. 3 is a view similar to Fig. 1 showing the manner in which a container is detachably secured to or removed from the receiving shelf or cabinet.
Fig. 4 is a view in perspective of the novel record container of this invention provided with a cover so as to serve as a record merchandising package.
Fig. 5 is a view in perspective of a modification of the container of this invention.

The illustrative embodiment of the invention shown in Figs. 1 to 3 and including the separate showing of the container or box in Fig. 4 will now be described in detail. It will be understood that while the use of the invention is illustrated in connection with small diameter light weight records having large center holes, it is useable in connection with any type of article which is to be stored in an accessible manner. Reels of magnetic tape, for example, may be stored. Reference character 10 represents a portion of a storage cabinet, phonograph cabinet or the like having an article receiving and supporting shelf 12 therein. The shelf 12 is or may be of any desired length and the cabinet 10 or the storage space therein may be provided with enclosing side or end walls, one of which, the wall 14, appears in Figs. 1 to 3 of the drawing. A cabinet top, compartment top, or other enclosure member (not shown) may be provided for enclosing the storage space at its top. A rod-like member 16, which is shown as being circular in cross section, is supported in any suitable manner within the cabinet 10 above the shelf 12. As illustrated in Figs. 1 to 3 of the drawing, the rod-like member or rod 16 is spaced inwardly from the front of the enclosure which is represented by the outer edge 18 of the side wall 14. It will be understood that the rod 16 need not span the full width of the storage space but may be supported, as by suitable brackets (not shown), in a desired position with respect to the shelf 12. As the record container 21, shown in its entirety in Fig. 4, is self-supporting and partitions are not required in the storage space, or need not be associated with a storage shelf, it is feasible to have the rod 16 of any length and supported in any suitable manner unhampered by the presence of partitions. The cabinet 10, or the portion of the cabinet provided with the shelf 12, is provided with a back or partition 22 disposed near the open end of the container 21 when it is positioned as shown in Fig. 1.

While the shelf 12 and the rod 16 have been described above in association with a cabinet, it will be understood that the part 12 may be a separate base carrying a member having the function of the rod 16. Ends, similar to the wall 14, and a back 22 may be erected on the base. A portable record filing system may thus be provided in accordance with this invention.

Referring now to Fig. 4, the record container 21 is preferably of somewhat rigid construction or it is made sufficiently rigid for purposes discussed herein by means of reinforcing. The box-like container 21 has two side walls 24 and 25 and a bottom or end 26. The end 26 as well as the oppositely disposed end walls 28 and 29 are of substantial width so that the container will stand upright on a shelf or other flat support. In Figs. 1 to 3 the box 21 is shown as containing one or more records 32 having relatively large center holes 33. To obtain easy removal of the records, particularly of the type just mentioned, the side walls 24 and 25 are notched as indicated at 36, the notch ending in an arcuate recess or finger opening 38. A rectangular cover 41 of the slip-over type is shown in Fig. 4. This cover may be discarded or dispensed with entirely when the container is used as a record holder in conjunction with the rod 16, or its equivalent, in a record filing system of the present invention. The container or box 21 together with its cover will serve as a record merchandising package and the box and cover may be used by the purchaser of the records as a record holder if the purchaser does not care to use an orderly filing system such as is provided by this invention. The container 21 may bear suitable indicia on the outside of the bottom or end 26 to identify the contained records when they are offered for sale, and also, to identify the contained records and their position in a filing system provided by the present invention. The end 26 appears somewhat like the spine or back of a book when the container 21 rests in the position of Fig. 1. The notches 36 facilitate replacement of the cover 41 when it is used. If the notches were not present, it would be necessary to press the sides 24 and 25 together, in the event that these sides bulged outwardly, before slipping on the cover 41.

Fig. 5 of the drawing shows a slightly modified arrangement of the container 21 in which means is provided for readily changing the indicia identifying the records contained in or to be inserted in the container. Reference character 21*a* indicates a container, similar to the previously described container 21, having a notch or slot 43*a*. The notch 43 of the container 21 and its function will be described more in detail below. The end 26*a* of the container is recessed as indicated by reference character 54 and is provided with lips 55 and 56. A slip 58 of paper, plastic or the like may be inserted from either end into the recess 54. This slip is provided, as indicated on the drawing, with record identifying indicia to facilitate the maintenance of a record filing system.

One edge of the container 21 is notched as indicated by reference character 43. This slot or notch 43, in the illustrative example, is inclined at 45 degrees to the horizontal as the container 21 is viewed in Figs. 1 and 4. Where the container 21 is constructed of material such as cardboard which requires reinforcement the notch 43 is cut into a reinforcing block 44 as well as into the side walls 24 and 25 and the end wall 29. The block 44, if required by the structural nature of the container 21, may be cut from wood or otherwise formed of any suitable material. If the container is molded from plastic or fabricated from a metal reinforcement will not be required. The slot or notch 43 lies outside of the circumference of a record or records in the container 21.

The previously described rod 16 serves as a pivot and cooperates with the notch 43 to secure the container 21 along with other containers, if desired, on the shelf 12 or a similar support. Figs. 1 to 3 of the drawing show the manner in which the notch 43 engages the rod 16 in the several positions of the container 21. Fig. 3 shows a container about to have its slot 43 engaged with the rod 16. From the position shown in Fig. 3 the container is tilted slightly to the left at the same time that it is moved rearwardly or to the left as shown on Fig. 3. As a continuation of this step, it may be moved to the position of Fig. 1 or tilted back to the position of Fig. 2. A relatively wide groove or recess 48 in the shelf 12, extending longitudinally beneath the rod 16, provides clearance for the corner of the container 21 adjacent the notch 43 when the container is moved from the position of Fig. 1 to the position of Fig. 2 and vice versa. The position of the container 21 in Fig. 3 of the drawing also indicates the position which permits the notch 43 to be withdrawn from engagement with the rod 16.

With the container 21 in the position shown in Fig. 1, a finger may be placed on the upper right hand corner of the container so as to rotate it on the rod until it assumes the position shown in Fig. 2. The notch 36 permits the finger of the user's hand to be inserted in the center hole of the contained record or records so that they may be removed from the container. Likewise after the records have been played they can be inserted into the container 21 which can then be rotated into its original position as shown in Fig. 1. It is to be noted that the container 21 is locked in place on the rod 16 when positioned as shown in Fig. 2.

With the container 21 in the position shown in Fig. 2, the ends are substantially vertical since the bottom 26 of the container rests on the lip 51 of the shelf. If desired, the lip 51 may be cut down so that the container 21 is inclined toward the right as viewed in Fig. 2. This arrangement of the lip 51 may facilitate removal of records from the container when the arrangement is used in cabinets which have a top wall. Locking engagement of the container with the rod is maintained. If a record storage arrangement is used as a separate device which can be left open at the top, then the position of the container 21 shown in Fig. 2 is or may be suitable.

What is claimed is:

1. An article storing arrangement comprising a rectangular self-supporting container, said container having a straight bottom and at least one straight side, the top of said container being open for insertion and removal of articles to be stored therein, said container having a notch extending inwardly from said straight side and being inclined toward said bottom, a shelf for supporting said container, a rod positioned above said shelf, said rod being spaced inwardly from the edge of said shelf, said notch in said container being positioned for engagement with said rod when said straight side of said container is inclined with respect to said shelf, said notch in said container being engaged by said rod while said straight side of said container is supported by said shelf, an elongated recess in said shelf extending beneath said rod to permit rotation of said container while said rod is engaged in said notch, and the margin of said shelf between its edge and the outside edge of the recess providing a lip for supporting said bottom of said container when said container is rotated about said rod until the bottom thereof is parallel with said shelf while maintaining said rod in full engagement with said notch whereby said container is firmly positioned with said open top accessible to permit insertion or removal of articles.

2. An arrangement for providing storage of phonograph records comprising a phonograph record container of substantial thickness with said container having a straight bottom and at least one straight side, the top of said container being open for insertion and removal of phonograph records, said container having a notch extending inwardly from said straight side and being inclined toward said bottom, a shelf for supporting said container, a rod positioned above said shelf, said rod being spaced inwardly from the edge of said shelf, said notch in said container being positioned for engagement with said rod when said straight side of said container is inclined with respect to said shelf, said notch in said container being engaged by said rod while said straight side of said container is supported by said shelf, an elongated recess in said shelf extending beneath said rod to permit rotation of said container while said rod is engaged in said notch, and the margin of said shelf between its edge and the outside edge of the recess providing a lip for supporting said bottom of said container when said container is rotated about said rod until the bottom thereof is parallel with said shelf while maintaining said rod in full engagement with said notch whereby said container is firmly positioned with said open top accessible to permit insertion or removal of phonograph records.

References Cited in the file of this patent

UNITED STATES PATENTS

| | | |
|---|---|---|
| 1,306,737 | Bauschbach | June 17, 1919 |
| 1,336,382 | Schlingloff | Apr. 6, 1920 |
| 1,340,364 | Bentley | May 18, 1920 |
| 1,429,339 | Green | Sept. 19, 1922 |
| 1,572,454 | Vastola | Feb. 9, 1926 |
| 2,335,107 | Ciringione | Nov. 23, 1943 |
| 2,535,688 | Lowther | Dec. 26, 1950 |
| 2,555,594 | Markovitz | June 5, 1951 |

FOREIGN PATENTS

| | | |
|---|---|---|
| 237,643 | Great Britain | July 28, 1925 |
| 489,237 | Great Britain | July 22, 1938 |
| 772,347 | France | Oct. 27, 1934 |